Jan. 11, 1927.

F. H. BERGHORN 1,613,783

TRACTOR HITCH

Filed Feb. 25, 1926

Inventor
F. H. Berghorn,
By Clarence A. O'Brien
Attorney

Patented Jan. 11, 1927.

1,613,783

UNITED STATES PATENT OFFICE.

FRED H. BERGHORN, OF LATIMER, IOWA.

TRACTOR HITCH.

Application filed February 25, 1926. Serial No. 90,604.

My present invention has to do with tractor hitches; and it has for one object the provision of a hitch, designed more especially for connecting a gang plow such as ordinarily drawn by horses to a tractor and this so that the plow can be operated and turned from the tractor seat by the tractor driver, thus providing a tractor drawn outfit without the necessity of the farmer buying a new plow for use in conjunction with the tractor.

Another object is the provision of a hitch adapted to give way and prevent injury to a plow in the event of the latter encountering a rock or other material obstruction in its path.

Other objects and practical advantages of the invention will be fully understood from the following description and claims when the same are read in connection with the drawings, accompanying and forming part of this specification, in which:—

Similar numerals of reference designate corresponding parts in both views of the drawings.

Figure 1:
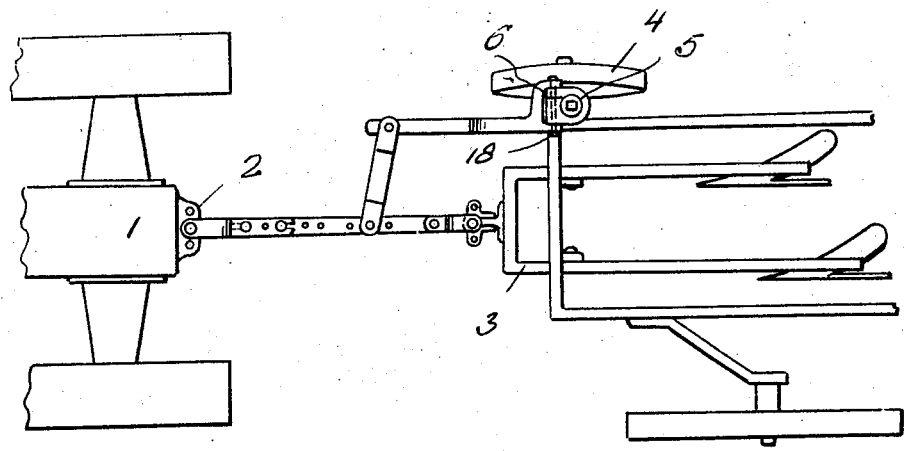
Figure 1 is a top plan view illustrating a portion of a tractor and a portion of a gang plow connected together through the medium of the hitch constituting the best practical embodiment of my invention of which I am aware.
Figure 2:
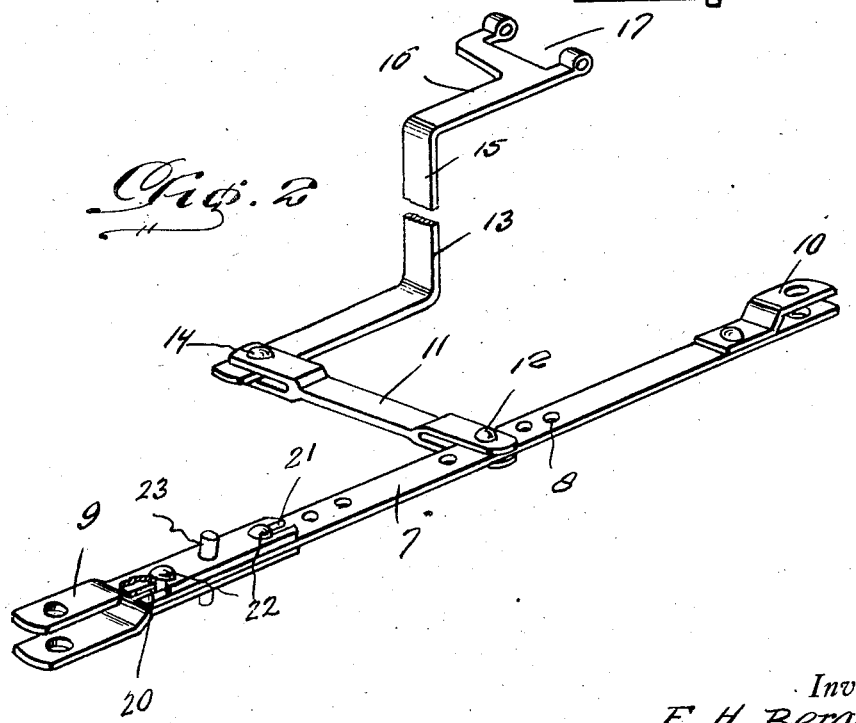
Figure 2 is an enlarged broken perspective showing my novel hitch per se.

I show in Figure 1 a tractor 1, with a draw plate 2, and I also show in Figure 1 a gang plow 3 having at 4 a ground wheel carried by a shaft 5 that is turnable about its axis and is provided with the arm portion 6, it being understood in this connection that when the shaft 5 is turned about its axis through the medium of the arm 6, the wheel 4 will be swung toward the right or toward the left, as the case may be.

My novel hitch is made up of a major bar 7 provided, by preference, with a plurality of apertures 8 for adjustment purposes, and suitably equipped at its ends as designated by 9 and 10 for pivotal connection to the draw plate 2 of the tractor and the plow 3, respectively. In addition to the major bar 7, the hitch comprises a swingable link 11 pivotally connected at 12 to the bar 7 and extending laterally therefrom, and a bar 13, pivotally connected at 14 to the outer end of the link 11 and extending rearwardly from said link 11 and in substantial parallelism with the vertical plane of the bar 7. The said bar or member 13 is shown as provided with an intermediate upright portion 15, and at its upper end said intermediate portion 15 is merged into a rearwardly directed arm 16 the rear portion of which is bifurcated at 17 to receive the arm 6 and is pivotally connected at 18 to the said arm 6. I would have it understood, however, that the bar 13 may be a straight apertured bar, and that the elements 15, 16 and 17 may be comprised in a casting on a plow.

It will be apparent from the foregoing that by virtue of my novel hitch, turning of the tractor 1 toward the right will be attended by swinging of the wheel 4 toward the right, while turning of the tractor toward the left will be attended by corresponding swinging of the wheel 4; and it will further be apparent that one or more wheels other than the wheel 4 may when deemed expedient be connected with and turnable or swingable from the shaft 5.

In order to prevent injury to the plow in the event of the plow encountering a rock or other large obstruction in its path, I provide the bar 7 with a longitudinal slot 20 in its forward end portion; and I also slot the upper and lower members of the equipment 9 as designated by 21. Rivets 22 appropriately headed as shown connect the upper and lower members of the equipment 9, and it will be noted that the rear rivet extends through the bar 7 and is disposed in the slots 21 of the said members comprised in the equipment 9, while the forward rivet 22 connects the said members of the equipment 9 and is disposed in the slot 20 of bar 7. A weak pin 23, of wood or other appropriate material is located intermediate of the rivet 22 and is extended through coincident apertures in the members of the equipment 9 and the bar 7. Manifestly so long as the bar 7 is not subjected to any undue or extraordinary stress, the pin 23 will serve as an efficient connection between the members of the equipment 9 and the bar 7. In the event, however, of any one of the plows of the gang bringing up against a large rock or other stable obstruction, the weak pin 23 will break and permit separation of the members of the equipment 9 from the bar 7, and hence no material injury to the plow will ensue.

It will also be noted at this point that the means provided for meeting the contingency indicated is simple and inexpensive, and when the pin 23 is broken under the circumstances set forth a fresh pin 23 may be inexpensively employed for the connection of the members of the equipment 9 to the bar 7.

Notwithstanding the practical advantages ascribed to my novel hitch, it will be readily appreciated that the hitch is simple and inexpensive in construction, is susceptible of ready application in interposed relation between a tractor and a gang plow, and is well adapted to withstand the usage to which tractor hitches are ordinarily subjected.

I have specifically described the present and preferred embodiment of my invention in all of its details in order to impart an exact understanding of the said embodiment. I do not desire, however, to be understood as limiting myself to the precise construction and relative arrangement of parts as disclosed, my invention being defined by my appended claim within the scope of which modifications in structure and in arrangement may be made without departure from my invention.

Having described my invention, what I claim and desire to secure by Letters-Patent, is:—

In combination, a tractor, a plow having a swingable or turnable element, and a ground wheel carried by and movable with said element, and a hitch comprising a major bar interposed between and connected to the tractor and the cultivator, and also comprising a lateral, swingable link on the major bar, and a bar or member connected to and extending rearwardly from the said link and connected to and adapted to transmit motion to the said wheel carrying element of the cultivator; the said bar or member connected through the link to the major bar being of angular form and including an intermediate upright portion and also including an arm extending rearwardly from the upper end of said intermediate portion and terminating in a bifurcated portion straddling the said swingable element of the cultivator and pivotally connected to said swingable element whereby the bar or member is adapted to swing in a vertical plane and at right angles to the movement of the said swingable element.

In testimony whereof I affix my signature.

FRED H. BERGHORN.